Patented Aug. 18, 1942

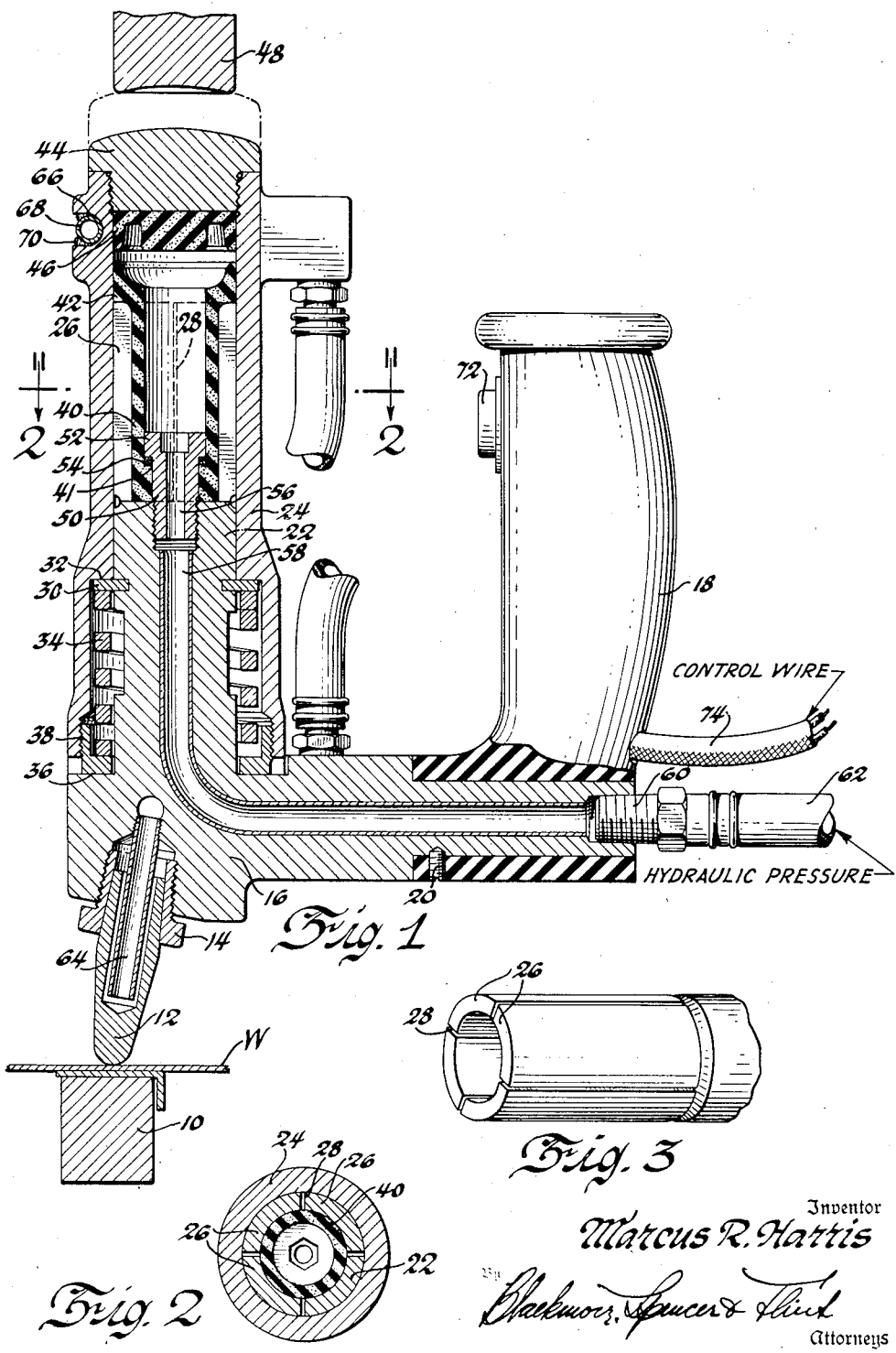

2,293,337

UNITED STATES PATENT OFFICE 2,293,337

WELDING APPARATUS

Marcus R. Harris, Indianapolis, Ind., assignor to General Motors Corporation, Detroit, Mich., a corporation of Delaware Application October 6, 1939, Serial No. 298,187

3 Claims. (Cl. 219—4)

This invention relates to welding apparatus and has particularly to do with electric resistance welding apparatus, especially spot-welding apparatus.

Among the objects of my invention are: to provide improvements in, and simplification of, spot-welding apparatus; to provide an improved and simplified spot-welding apparatus of the portable type; to provide improvements in the electrical connection between movable parts of welding apparatus; and to provide an improved spot-welding "gun" of the portable type in which the gun serves as means for applying pressure to the parts to be welded and also as a means of "shorting out" the current between a bucking bar and electrode. Other objects and advantages of my invention will become more apparent from the detailed description which follows, reference here being made to the accompanying drawing forming a portion of the specification and illustrating an embodiment of my invention.

In the drawing:

Figure 1 is a central longitudinal sectional view of a welding apparatus in accordance with my invention.

Figure 2 is a sectional view on line 2—2 in Figure 1.

Figure 3 is a perspective view illustrating a split skirted piston adapted to form a good electrical connection with a cylinder wall of the welding apparatus during a welding operation.

In the drawing is shown an electrode 10 on which is placed the work to be welded W. Contacting the work W is a welding point or electrode 12, the welding point being removably secured by means of a screw-threaded coupling 14 to a body member 16. The body member is generally L-shaped, one branch or arm having a handle 18 shown in the drawing as formed of suitable non-conducting material. However, it will be understood that it is not required that the handle be non-conducting as the secondary voltages are usually low and in this event metallic handles may be used, such as, for example, cast bronze. A set screw 20 secures the handle to the arm. The other arm has a portion forming a piston 22 within a cylinder 24. The upper end of the piston, as viewed in Figure 1, has a split or slotted skirt portion formed by means of segments 26 separated by slots 28 (see also Figures 2 and 3). A collar member 30 engages an undercut groove in the lower end of the piston 22, the upper side of the collar forming a seat for a shoulder 32 on the cylinder. A coil spring 34, acting against the underside of collar 30 and against the flanged portion 36 of a ring 38 in screw threaded engagement with the lower end of cylinder 24, normally biases the cylinder to the position shown in Figure 1 with the shoulder 32 seated on the collar 30.

Within the slotted skirt of the piston is a flexible-walled member 40 formed of Neoprene or other suitable material, member 40 having at its lower end an inwardly extending flanged portion 41 and having a flanged portion 42 contacting the inner wall of the cylinder above the piston skirt. A cap member 44 in screw-threaded engagement with the upper end of the cylinder closes the same. Contacting the inner face of the cap and cylinder wall is a suitable sealing element 46 formed of Neoprene or other suitable flexible material. Above the cap member 44 is a bucking bar 48.

The flanged lower end of the flexible-walled member 40 is connected by means of a screw-threaded member 50 to the head of the piston. Member 50 has a head 52 forming a tight fit with the lower portion of the inner wall of the flexible-walled member 40. A suitable gasket 54 between flange 41 and head 52 forms a liquid tight seal between these parts. A passageway 56 for hydraulic fluid is provided in member 50 and joins a passage 58 formed in the body member 16. A coupling 60 connects passage 58 to a hydraulic fluid line 62.

The body of the welding point 12 is hollow and has a tube 64 extending therein. This construction is for conducting a fluid such as water to cool the welding point. Adjacent the upper end of the cylinder in a groove 66 is a metallic tube 68. High melting point solder 70 secures the tube in the groove. Water is caused to flow through the tube 68 to cool the upper end of the cylinder and associated parts adjacent the bucking bar.

In the handle of the gun is a push button switch 72 for completing an electrical circuit through control wire 74 to any suitable form of control (not shown) for admitting hydraulic fluid to build up hydraulic pressure to operate the cylinder. For example, the control circuit may actuate a solenoid air-valve of a combined air and fluid system as described in my copending application Serial No. 258,406, filed February 25, 1939.

In the operation of the device the welding gun is placed between the electrode 10 and the bucking bar 48 with the point 12 resting on the work W. Switch 72 is closed by the operator to complete an electrical circuit to cause hydraulic fluid to flow through passages 56 and 58 into the chamber formed by the flexible-walled member 40, the upper portion of inner wall of cylinder 24, and member 46. As the pressure builds up, the cylinder is forced up against the bucking bar, making a pressure contact between the cap member 44 and the bucking bar, and also squeezing the work W between the point 12 and electrode 19. As the hydraulic pressure reaches a certain value, the pressure causes the sides of the flexible-walled member to be forced outwardly to cause the split skirt of the piston to expand and press against the cylinder wall. When the pressure has built up throughout the system it closes a switch (not shown) to energize the bucking bar. The current flows along the bucking bar, through the cap 44 to the cylinder wall, then to the piston through the pressure contact between the expanded split skirt and cylinder wall, then to the welding point, and then through the work to the electrode 19, thus forming a weld.

After the weld is completed, the current flow is cut off in any suitable way, for example by means of a suitable timer. The control circuit is then opened to permit the hydraulic pressure in the cylinder to fall, thus allowing the split skirt of the piston to contract. Spring 34 returns the cylinder to normal or non-welding position.

In the construction described, no heavy cables are attached to the welding gun. This results in a light weight construction that is easier to handle than those forms of portable welding guns in which it is necessary to move the welding cables with the gun to different positions. By the use of the split-skirted piston and associated structure the piston skirt is forced into pressure engagement with the cylinder wall before welding current is applied. Thus a good electrical contact is formed between the parts whereby arcing is eliminated. The bucking bar, welding electrodes, piston, cylinder, etc. are formed of any suitable conducting material such as, for example, copper or alloys thereof.

Various changes and modifications in the embodiment of my invention described herein may be made without departing from the spirit and principle of my invention, and I do not intend to limit the patent granted for my invention except as necessitated by the prior art.

I claim:

1. In an electric spot welding gun of the type in which the welding gun serves as a means for applying pressure to the parts to be welded and also as a means of "shorting out" the welding current between a bucking bar and electrode on which the work to be welded is placed, the combination which includes a cylinder formed of current conducting material, a piston in said cylinder formed of current conducting material and having an expansible split skirt, a welding point fixed to one of the latter, spring means normally maintaining the cylinder and piston in non-welding position, means to admit fluid to the cylinder to build up pressure therein and move the cylinder with respect to the piston into pressure engagement with the bucking bar and to cause the welding point to engage the work with welding pressure, and means to expand the split skirt of the piston into current conducting relation with the cylinder after the cylinder and welding point are in pressure engagement with the bucking bar and work, respectively, said last mentioned means including a flexible-walled member within said split skirt actuated by means of fluid pressure built up within the cylinder after the cylinder and welding point have engaged the bucking bar and work, respectively.

2. In electric spot welding apparatus, a body member formed of current conducting material and having a portion forming a split skirted piston, a cylinder of current conducting material cooperating with said piston, a welding electrode carried by said body member, a flexible-walled member within the split skirt of the piston, spring means normally maintaining the piston in non-welding position, and means to admit fluid through the body member and piston to said cylinder to build up pressure in the cylinder to move the same against the spring pressure to welding position and to force the welding electrode into pressure engagement with work to be welded, the fluid pressure within said flexible-walled member forcing the split skirt of the piston into pressure contact with the cylinder wall after relative movement between the cylinder and piston.

3. In a portable electric spot welding apparatus, an L-shaped body member formed of current conducting material having a portion forming a split skirted piston at one end, a handle secured to the other end of the body member, a cylinder of current conducting material slidably engaging the piston, a welding electrode carried by said body member, spring means normally maintaining the cylinder in non-welding position, a flexible-walled member within the split skirt of the piston, means securing the flexible-walled member to the piston, said securing means having a fluid passage therein, and a fluid passage within the body member joining the fluid passage in said securing means to admit fluid to the cylinder to build up pressure therein to move the cylinder against the spring pressure to welding position and to force the welding electrode into pressure engagement with work to be welded, the fluid pressure within the flexible-walled member forcing the split skirt of the piston into pressure contact with the cylinder wall after relative movement between the cylinder and piston.

MARCUS R. HARRIS.